Figure 1:
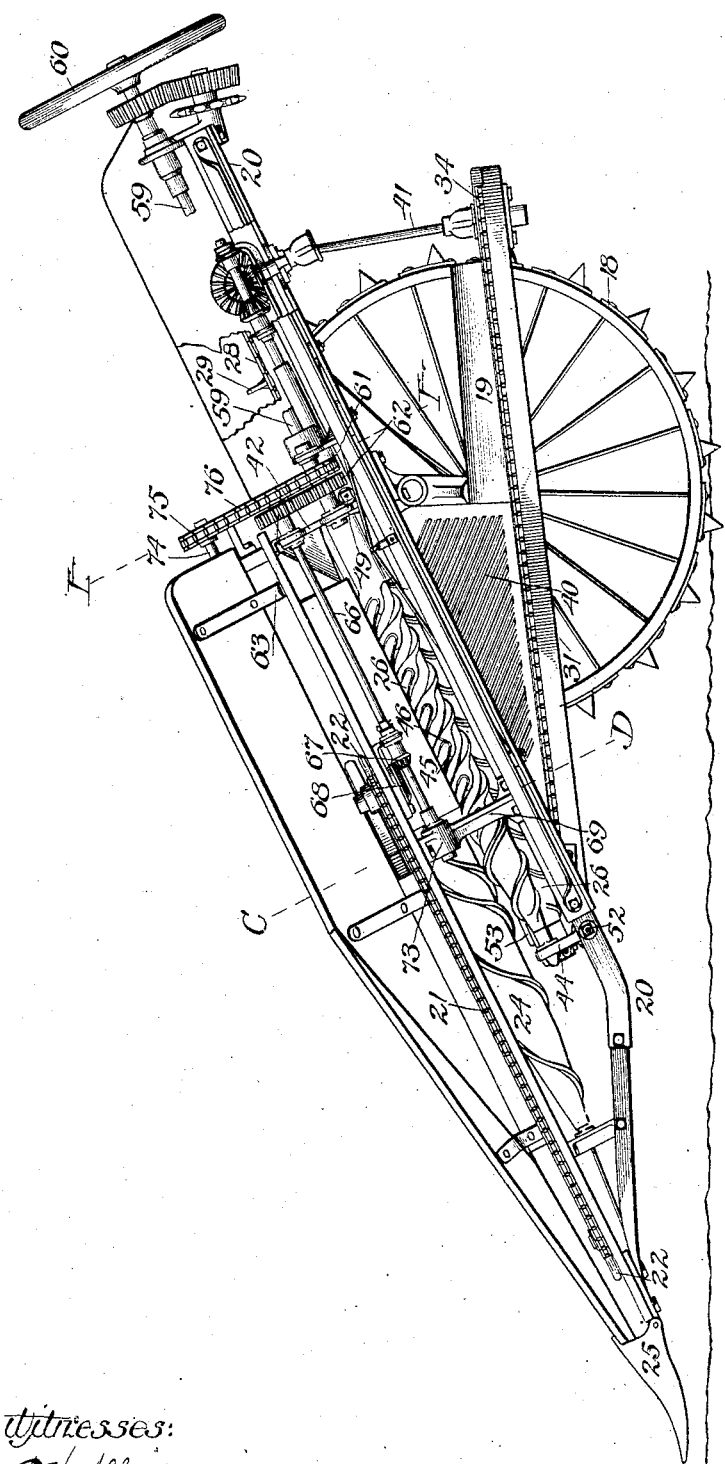

No. 786,239. PATENTED MAR. 28, 1905.
J. A. STONE.
CORN HARVESTER AND HUSKER.
APPLICATION FILED OCT. 22, 1904.

4 SHEETS—SHEET 1.

Witnesses:
P. H. Alfreds.
J. N. Daggett.

Inventor:
John A. Stone.
By E. W. Burgess
Attorney.

No. 786,239. PATENTED MAR. 28, 1905.
J. A. STONE.
CORN HARVESTER AND HUSKER.
APPLICATION FILED OCT. 22, 1904.
4 SHEETS—SHEET 2.
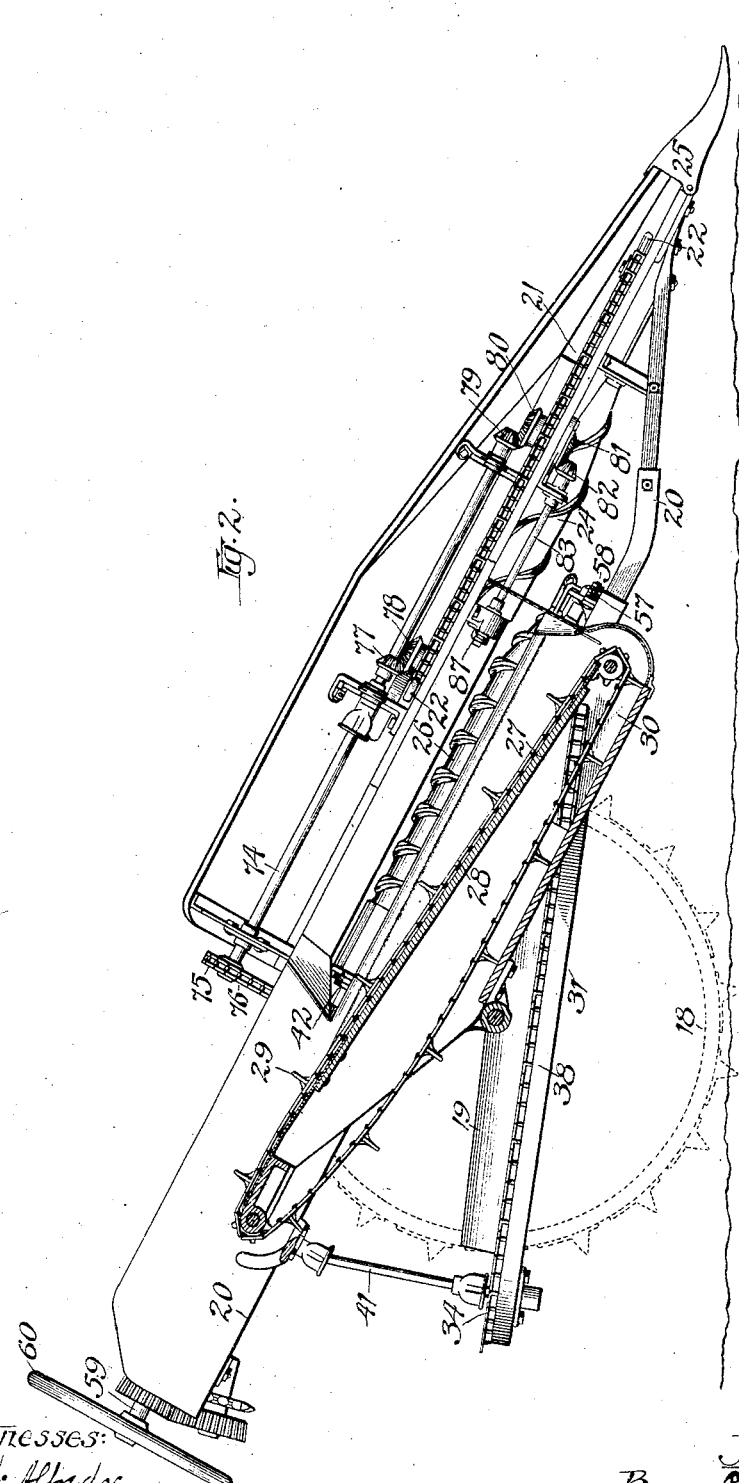
Witnesses:
Inventor:
John A. Stone.
By E. W. Burgess
Attorney No. 786,239. PATENTED MAR. 28, 1905.
J. A. STONE.
CORN HARVESTER AND HUSKER.
APPLICATION FILED OCT. 22, 1904.
4 SHEETS—SHEET 3.
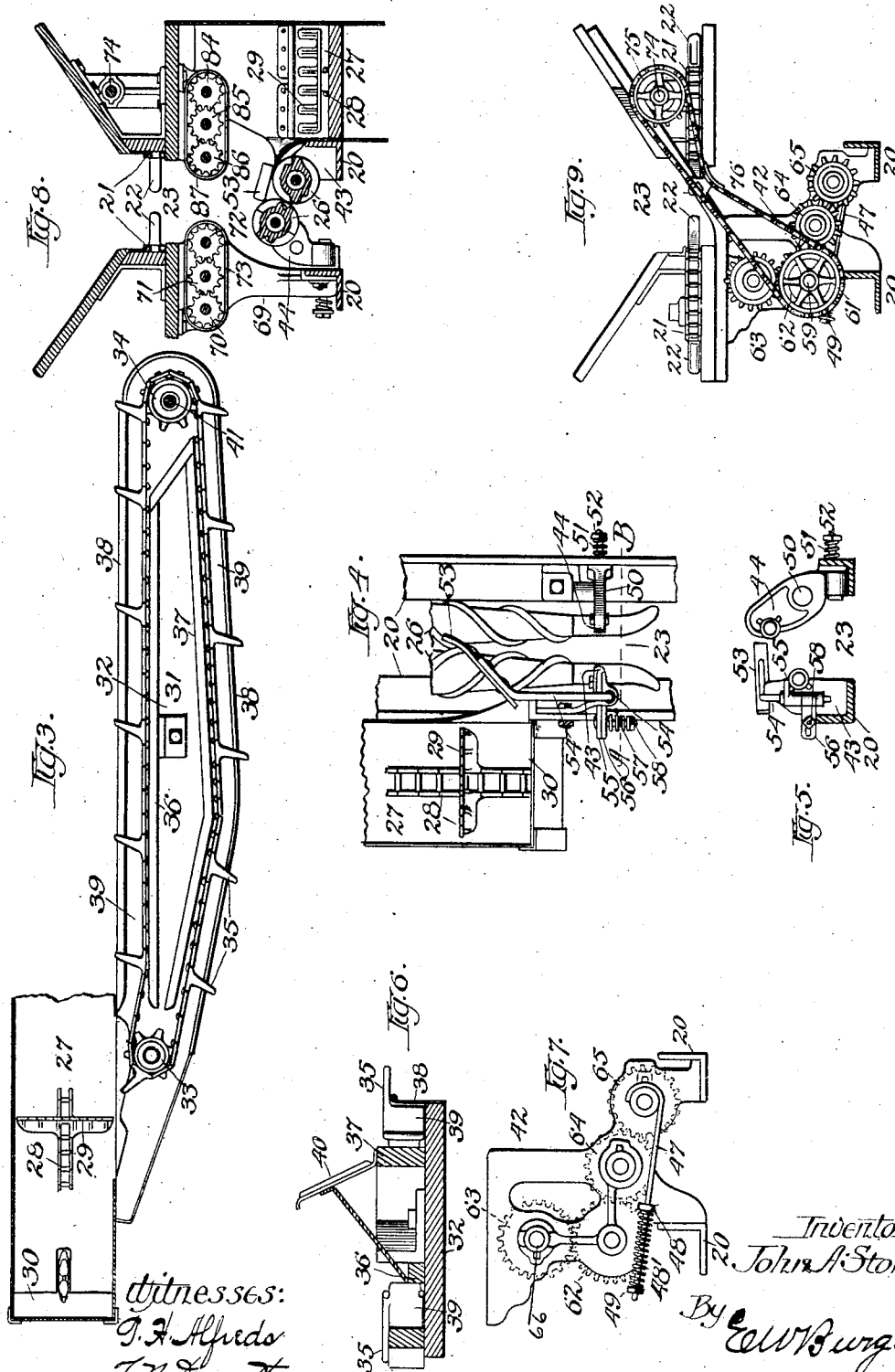
Witnesses:
J. H. Alfreds
T. N. Daggett
Inventor:
John A. Stone.
By E. W. Burgess
Attorney.

No. 786,239. PATENTED MAR. 28, 1905.
J. A. STONE.
CORN HARVESTER AND HUSKER.
APPLICATION FILED OCT. 22, 1904.
4 SHEETS—SHEET 4.
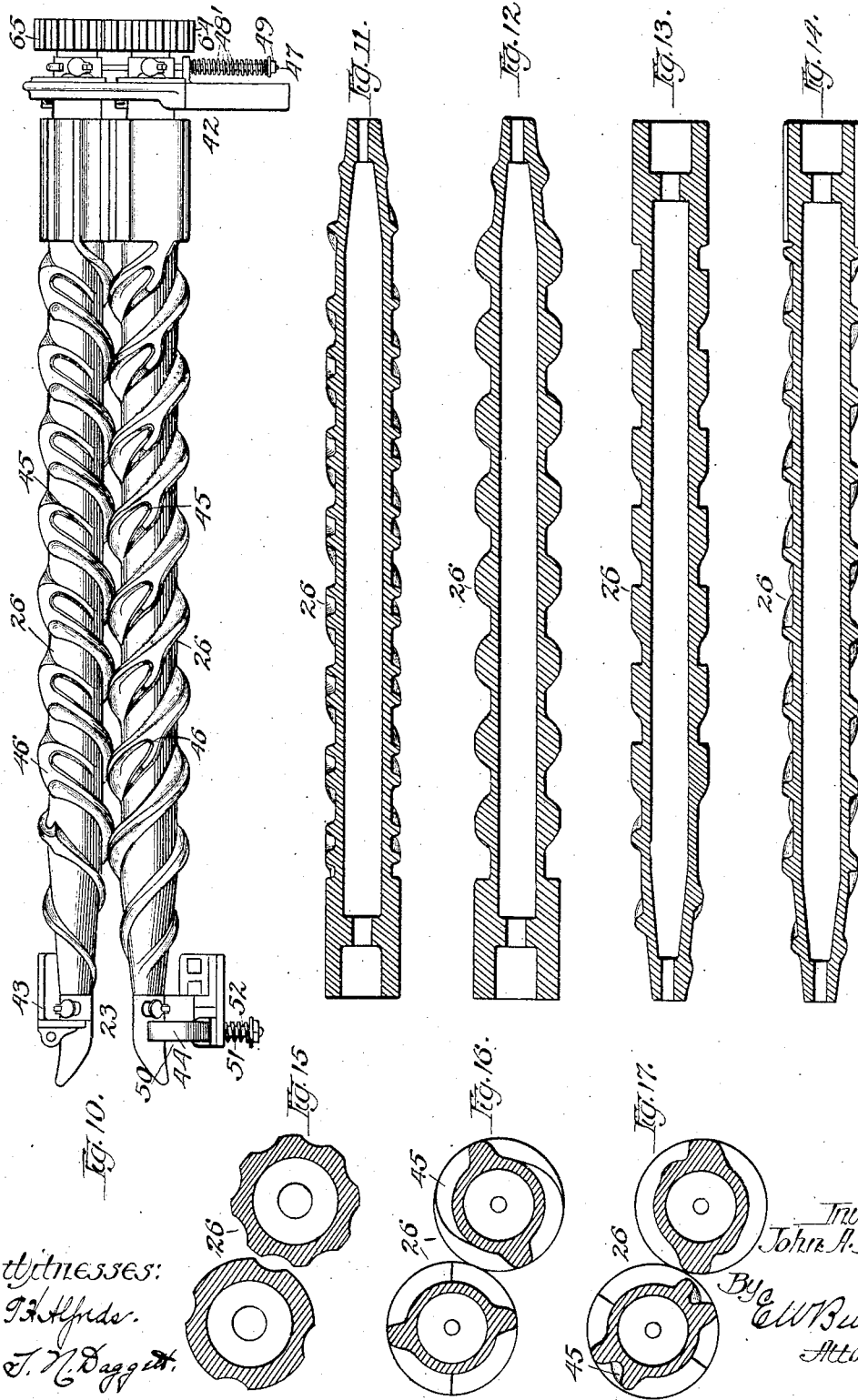
Witnesses:
F. H. Alfred.
J. N. Daggett.
Inventor
John A. Stone.
By E. W. Burges
Attorney No. 786,239.

Patented March 28, 1905.

UNITED STATES PATENT OFFICE.

JOHN A. STONE, OF CHICAGO, ILLINOIS.

CORN HARVESTER AND HUSKER.

SPECIFICATION forming part of Letters Patent No. 786,239, dated March 28, 1905.

Application filed October 22, 1904. Serial No. 229,526.

*To all whom it may concern:*

Be it known that I, JOHN A. STONE, a citizen of the United States, residing at Chicago, in the county of Cook and State of Illinois, have invented certain new and useful Improvements in Corn Harvesters and Huskers, of which the following is a specification, reference being had to the accompanying drawings, forming a part thereof.

My invention relates to corn-harvesters, and in particular to that type of machine designed to detach the ears from the standing stalks and convey them to a husking mechanism, (not shown;) and the object of the invention is to provide such machine with improved gathering devices to properly present the stalks to the snapping-rollers, an improved form of snapping-roller, a grain-saving attachment to catch any grain that may be shelled from the ears of corn by the action of the feeding or snapping rollers, and such other improved devices as will be more particularly illustrated by the drawings and described in the specification accompanying this application.

In the drawings, Figure 1 represents a side elevation of so much of a machine of the above class sufficient to show the application of my invention. Fig. 2 is a view, partly in section, taken from the opposite side of the machine from that shown in Fig. 1. Fig. 3 is a detail of the grain-saving device. Fig. 4 is a detail of a part of the snapping-rollers and ear-conveyer at their forward ends. Fig. 5 is a sectional detail on line A B of Fig. 4. Fig. 6 is a sectional detail of part of the grain-saving device. Fig. 7 is a detail of the driving mechanism of the snapping-rollers. Fig. 8 is a sectional detail of part of the roller-driving mechanism on line C D of Fig. 1. Fig. 9 is a sectional detail on line E F of Fig. 1. Fig. 10 is a detached view of the snapping-rollers, and Figs. 11, 12, 13, 14, 15, 16, and 17 are details of the same.

Like numerals represent the same parts throughout the various views.

18 represents one of the carrying-wheels, and 19 is a portion of the main frame, upon which is suitably mounted the frame 20, which supports the gathering and snapping devices.

These devices consist in part of gathering-chains 21, having carrying-fingers 22, located upon opposite sides of a stalk-passage 23, adapted to allow a row of corn to pass along it, feeding or forwarding rolls 24, having spirally-arranged ribs projecting therefrom and being tapered at their forward ends and also located upon opposite sides of the passage 23 below the carrying-chains 21.

The machine is provided with the usual gathering-prongs upon opposite sides of the stalk-passage, having divider-points 25 at their ends. The gathering-chains 21 operate from points near the rear end of the divider-points 25 upward and rearward and serve to pick up the fallen stalks and, in conjunction with the feeding and forwarding rollers 24, deliver them to the snapping-rollers 26, located in rear of and below the said gathering-chains and feeding-rollers and also extending rearwardly and upwardly parallel with them.

The snapping-rollers are mounted in a suitable frame and are given motion in opposite directions and operate to feed the stalks rearward and downward between them and to snap or break the ears from the stalks. It is preferred that one of the rollers be located in a higher plane than the other for the purpose of inclining the ears toward the conveyer-chute. As the ears of corn are disengaged from the stalks they drop into a trough or chute 27 at one side and below the plane of the rollers. An endless carrier 28, provided with flights 29, operates upward and rearward along the bottom of said trough to carry the ears to the husking mechanism. (Not shown.) At the lower end of the chute 27 there is located a receptacle or boot 30, and 31 is a grain-saving attachment located beneath the snapping-rollers and extending rearward beyond the same. The attachment consists of a plate-like frame 32, suitably supported upon the main frame and having bearings for the journals of sprocket-wheels 33 and 34 at opposite ends of the same. An endless carrier, having carrying-fingers 35, is given motion by the sprocket-wheels, and 36 and 37 are upstanding guides for the back of the chain, and 38 is an upstanding rim surrounding the plate 32 and forming, with the guides 36 and 37, a receiving-channel 39, into which any corn that is shelled by the operation of the snapping-rollers is caught and by means of the deflecting-screen 40, arranged beneath the said snapping-rollers, is directed into the receptacle. The grain-saving device is connected at its forward end with the boot 30, and the endless carrier operates to deliver the shelled corn into it, as shown in Fig. 3, from which it is elevated and carried along with the ears to the husking mechanism. The endless carrier is given motion through the sprocket-wheels by means of the shaft 41, connected with the roller-driving mechanism, as shown in Figs. 1 and 2.

The snapping-rollers 26 are of a well-known form relative to their body portion, having the tapering forward ends, forming an entrance-throat for the stalks, and the rearwardly-extending cylindrical portions, having parallel sides and terminating in short cylindrical portions provided with longitudinal grooves and ribs. The rollers are journaled at their rear ends in a bracket-casting 42, secured to the gathering-frame 20, and at their forward ends in blocks 43 and 44, secured to parts of the frame 20 upon opposite sides of the stalk-passage, as shown in Figs. 4 and 5. They are provided with an improved form of spirally-arranged ribs throughout the greater part of their length. As shown in Fig. 10, the ribs have branch portions 45, offset from and arranged parallel with the main portion, and the branches are so located upon the oppositely-disposed rollers that as the rollers revolve toward each other the spirally-arranged branch on one roller will coincide with the space between the branch and main portion of the rib upon the other—that is, if the branch ribs were high enough they would intermesh one with the other. The preferred form of arrangement of the series of branch ribs is to have the connections or offset portions in a line substantially parallel with the axis of the roller and with two lines of branches upon each roller. The rollers are so mounted that in the normal working of the machine the outer surfaces of the ribs will nearly contact one with the other. The branch ribs are gradually reduced in height as they extend from the main or trunk portion, having but a short portion of their outer surfaces the same height as the main spirals. The action of the main spirals conveys the stalks rearward as they are drawn through between the coacting rollers, and the function of the branch spirals is to hold the stalk in place between the branch and main trunk while the bridge or crotch portions 46 take a firm hold upon the stalk and force or snap the ears therefrom.

As shown in Fig. 7, the rollers are held in yielding contact at their rear ends by means of the hooked rod 47, connected with the sliding bearing at one end and passing through an ear 48 on the supporting-bracket 42 and provided with a coiled spring 48', surrounding its outer end, which abuts against the ear 48, the tension of the spring being regulated, by means of the nut 49, in the well-known way. The rollers are held in yielding relation at their forward ends by means of the bearing-block 44, being pivoted at 50 to a fixed support secured to the frame and having its lower end yieldingly held against the frame by means of the spring 51 and bolt 52 in a well-known manner, as shown in Figs. 4 and 5.

At the forward ends of the snapping-rollers there is mounted a swinging deflector-arm 53, that normally projects across the stalk-passage, as shown in Figs. 4 and 5. The arm has a vertical portion 54, that is journaled on the frame in a fixed bearing 55, and below the bearing is secured a crank-arm 56, that is normally held in contact with the fixed frame by means of the spring 57 and bolt 58, as clearly shown in Fig. 4. The function of the arm is to deflect any ears that may accidentally slide down the snapping-rollers into the receiving-chute 27.

The function of the spring 57 is to yieldingly hold the arm 53 across the stalk-passage for the purpose of deflecting any dropping ears, as aforesaid, and to allow said arm to swing before the action of the incoming stalks.

Motion is communicated to the various operating parts in the following manner: The shaft 59 is what may be termed the "primary" driving-shaft of the gathering, conveying, and snapping mechanism, and it derives motion in any preferred manner from the main driving or traction wheels and is provided with a fly-wheel 60 at its outer end to assist in maintaining a steady motion for the operative parts and extends forward and downward and connects with a sprocket-wheel 61, provided with a spur gear-wheel 62, that meshes with spur-pinions 63 and 64, and pinion 64 meshes with pinion 65, the two last-named pinions forming the driving-gear of the snapping-rollers, as shown in Fig. 7. Pinion 63 gives motion to shaft 66, suitably journaled in one side of the gathering-frame, as shown in Fig. 1, and secured to the said shaft near its middle portion is a bevel-pinion 67, meshing with a bevel-wheel 68, secured to the lower end of a short vertical shaft having a journal-bearing supported upon the frame and provided with a sprocket-wheel at its upper end that gives motion to one of the gathering-chains 21. The shaft 66 is journaled at its forward end in a bracket 69, secured to one side of the gathering-frame, as shown in Fig. 8, and has a pinion 70 secured thereto, that meshes with an intermediate pinion 71, that meshes with pinion 72, secured to the rear end of the feeding-roller 24 upon the same side of the stalk-passage. The gears are protected by a shield 73, surrounding them.

Referring to Fig. 2 of the drawings, a shaft 74 is suitably journaled in brackets secured to the gathering-frame upon that side of the stalk-passage and is given motion by means of the sprocket-wheel 75, secured to the rear end thereof, which is driven by means of a sprocket-chain 76, that connects said wheel with the sprocket-wheel 61 upon the opposite side of the stalk-passage, as shown in Fig. 9. The shaft 74 near its middle portion has a bevel-pinion 77 secured thereto, that meshes with a bevel-wheel 78, secured to a short vertical shaft that is suitably journaled in a supporting-bearing and has a sprocket secured to its lower end, that gives motion to the gathering-chain upon that side of the stalk-passage similar to that located upon the opposite side. At the forward end of shaft 74 there is secured a bevel-pinion 79, that meshes with a bevel-wheel 80, secured to the upper end of a short vertical shaft that is suitably journaled in a portion of the gathering-frame and has secured to its lower end a bevel-wheel 81, that meshes with a bevel-pinion 82, secured to the forward end of a short shaft 83, suitably journaled in brackets secured to the gathering-frame and extending rearward has the spur-pinion 84 secured thereto, which meshes with the intermediate spur-pinion 85, that drives the spur-pinion 86, secured to the rear end of the feeding-roller upon that side of the stalk-passage, as shown in Fig. 8, and a shield 87 protects the gears like that shown upon the opposite side.

What I claim, and desire to secure by Letters Patent, is—

1. In a machine of the class described, in combination, coacting snapping-rollers provided with spirally-arranged ribs adapted to convey the stalks rearward, said ribs having branch spirals offset therefrom.

2. In a machine of the class described, the combination of coacting snapping-rollers provided with spirally-arranged ribs adapted to convey the stalks rearward, said ribs having branches offset therefrom, and having their terminals arranged substantially parallel with the carrying-ribs.

3. In a machine of the class described, the combination of coacting snapping-rollers provided with spirally-arranged ribs adapted to convey the stalks rearward, said ribs having branches offset therefrom that are gradually reduced in height as they recede therefrom.

4. In a machine of the class described, the combination of coacting snapping-rollers provided with spirally-arranged ribs adapted to convey the stalks rearward, said ribs having substantially parallel branches offset therefrom that are gradually reduced in height as they recede therefrom.

5. In a machine of the class described, the combination of coacting snapping-rollers provided with spirally-arranged ribs adapted to convey the stalks rearward, said ribs having a series of branch spirals offset therefrom said series being substantially in a line parallel with the axes of the rollers.

6. In a machine of the class described, the combination of coacting snapping-rollers provided with spirally-arranged ribs adapted to convey the stalks rearward, said ribs having one or more series of branch spirals offset therefrom said series being substantially in a line parallel with the axes of the rollers.

7. In a machine of the class described, the combination of coacting snapping-rollers adapted to detach the ears from the stalks, an ear-conveying chute at one side of the said snapping-rollers to receive the ears therefrom, a shelled-corn receptacle beneath the said snapping-rollers, an endless moving conveyer in said receptacle, said endless conveyer operating to convey the shelled corn from said receptacle into said ear-conveying chute.

In witness whereof I hereto affix my signature in presence of two witnesses.

JOHN A. STONE.

Witnesses:
T. H. ALFREDS,
MARTIN SWANSON.